United States Patent

Asai et al.

[11] Patent Number: 6,140,451
[45] Date of Patent: Oct. 31, 2000

[54] SURFACE TREATING COMPOSITIONS

[75] Inventors: Mitsuo Asai; Hitoshi Uehara, both of Usui-gun, Japan

[73] Assignee: Shin-Etsu Chemical Co., Ltd., Tokyo, Japan

[21] Appl. No.: 09/174,257

[22] Filed: Oct. 16, 1998

[30] Foreign Application Priority Data

Oct. 17, 1997 [JP] Japan ...................................... 9-303552
Oct. 17, 1997 [JP] Japan ...................................... 9-303553

[51] Int. Cl.⁷ ....................................................... C08G 77/24
[52] U.S. Cl. ........................ 528/34; 106/287.11; 525/477; 528/35; 528/38
[58] Field of Search ................................... 528/34, 35, 38; 525/477; 106/287.11

[56] References Cited

U.S. PATENT DOCUMENTS 4,678,688  7/1987  Itoh et al. .
5,061,740  10/1991  Inomata ................................... 523/213
5,489,320  2/1996  Ono et al. ................................... 106/2
5,599,893  2/1997  Asai et al. ................................. 528/12

FOREIGN PATENT DOCUMENTS 2-233535   9/1990   Japan .
03290437A  12/1991  Japan .

*Primary Examiner*—Robert Dawson
*Assistant Examiner*—Jeffrey B. Robertson
*Attorney, Agent, or Firm*—Millen, White, Zelano & Branigan, P.C.

[57] ABSTRACT

A composition comprising a trifunctional polysilazane and a polysiloxane having at least one hydrolyzable group and an optional fluoroalkyl group is effective for treating substrates to render their surface water repellent, oil repellent, and anti-fouling.

19 Claims, No Drawings

SURFACE TREATING COMPOSITIONS

BACKGROUND OF THE INVENTION

1. Field of the Invention

This invention relates to a surface treating agent for treating the surface of glass, glass lenses, mirrors, plastics, plastic lenses, metals, ceramics, porcelain, and pottery for forming anti-fouling substances which are tack-free, anti-dust-sticking, water repellent, and oil repellent.

2. Background Art

It is known to impart anti-fouling and water repellent properties to optical lenses such as eyeglass lenses and camera lenses by forming cured coatings of silicone or fluorocarbon polymers as the outermost surface layer. The treating agent used to this end is proposed in U.S. Pat. No. 4,678,688, for example, as comprising a trifunctional polysilazane such as $C_8F_{17}C_2H_4Si(NH)_{3/2}$ or $C_4F_9C_2H_4Si(NH)_{3/2}$ or polysiloxazane. When an article is treated with such a trifunctional silicon compound alone, its surface is covered solely with a polymer having a three-dimensional structure. This coating is soft or tacky and thus has the drawback that dust will deposit and stick thereto and fingerprints are left after the coating is touched with fingers.

JP-A 233535/1990 discloses a glass surface treating agent comprising a perfluoro group-bearing silane, an organopolysiloxane, an acid and an organic solvent. This agent is not fully satisfactory in water repellent and anti-fouling properties.

SUMMARY OF THE INVENTION

An object of the present invention is to provide a surface treating composition capable of forming anti-fouling substances having water repellent, tack-free, and anti-dust-sticking properties.

We have found that when glass, glass lenses, mirrors, plastics, plastic lenses, metals, ceramics, porcelain, and pottery are treated on their surface with a composition comprising two organic silicon compounds of the formulas (1) and (2) defined below, anti-fouling substances which are tack-free, anti-dust-sticking, water repellent, and oil repellent are left on the surface.

The present invention provides a surface treating composition comprising first and second organic silicon compounds. The first organic silicon compound has the following general compositional formula (1):

  (1)

wherein Rf is a perfluoroalkyl group of 1 to 10 carbon atoms and $R^1$ is a divalent hydrocarbon group of 2 to 10 carbon atoms. The second organic silicon compound has the following general formula (2):

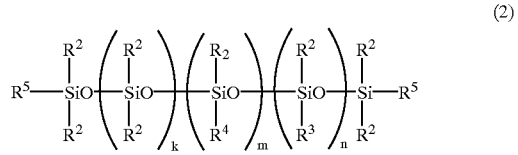  (2)

wherein $R^2$ independently represents monovalent hydrocarbon groups of 1 to 10 carbon atoms; $R^3$ is a hydrolyzable group of the following general formula (3) or (4):

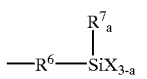  (3)

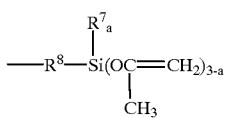  (4)

wherein $R^6$ is a divalent hydrocarbon group of 2 to 10 carbon atoms or oxygen atom, $R^7$ is a monovalent hydrocarbon group of 1 to 10 carbon atoms, $R^8$ is a divalent hydrocarbon group of 2 to 10 carbon atoms, X is a halogen atom, acyloxy group of 2 to 10 carbon atoms, or alkoxy group of 1 to 10 carbon atoms, and letter a is an integer of 0 to 2; $R^4$ is a monovalent hydrocarbon group of 1 to 10 carbon atoms which may contain fluorine atoms; $R^5$ represents $R^3$ or $R^4$, the $R^5$ groups may be identical or different; letter k is an integer of 0 to 100, m is an integer of 0 to 100, n is an integer of 0 to 5, with the proviso that at least one $R^5$ group is $R^3$ when n is 0.

DETAILED DESCRIPTION OF THE INVENTION

As defined above, the surface treating composition of the invention contains two types of organic silicon compounds as essential components.

The first organic silicon compound has the following general compositional formula (1).

  (1)

In formula (1), Rf represents perfluoroalkyl groups of 1 to 10 carbon atoms, preferably 4 to 10 carbon atoms, for example, $C_nF_{2n+1}$ groups (n=1 to 10, preferably 4 to 10) such as $CF_3$-, $C_4F_9$-, and $C_8F_{17}$- groups. $R^1$ represents divalent hydrocarbon groups of 2 to 10 carbon atoms, for example, alkylene groups such as ethylene, propylene, butylene, hexylene, and octylene, cycloalkylene groups such as cyclohexylene, and arylene groups such as phenylene, with the ethylene, propylene and phenylene being especially preferred.

The second essential component of the surface treating composition according to the invention is an organic silicon compound having the general formula (2).

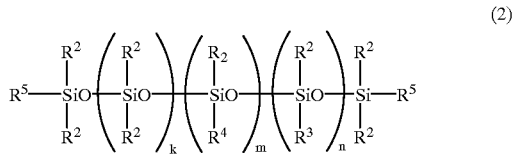  (2)

In formula (2), $R^2$, which may be the same or different, represents monovalent hydrocarbon groups of 1 to 10 carbon atoms, for example, alkyl groups such as methyl, ethyl, propyl, butyl, hexyl, octyl, and decyl; cycloalkyl groups such as cyclohexyl; alkenyl groups such as vinyl, allyl, propenyl, butenyl, and hexenyl; aryl groups such as phenyl and tolyl; and aralkyl groups such as benzyl and phenylethyl, with the methyl, ethyl, phenyl, and phenylethyl being especially preferred.

$R^3$ is a hydrolyzable group of the general formula (3) or (4).

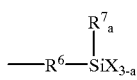

(3)

$R^6$ represents divalent hydrocarbon groups of 2 to 10 carbon atoms or oxygen atom, examples of the divalent hydrocarbon group being as described for $R^1$. $R^7$ represents monovalent hydrocarbon groups of 1 to 10 carbon atoms, examples of which are as described for $R^2$. $R^7$ is preferably methyl. X represents halogen atoms, acyloxy groups of 2 to 10 carbon atoms, or alkoxy groups of 1 to 10 carbon atoms, preferably 1 to 4 carbon atoms. Chlorine is a typical halogen atom. Examples of the acyloxy and alkoxy groups are given below.

$$-\underset{\underset{O}{\parallel}}{O}CCH_3, \quad -OCH_3, \quad -OC_2H_5$$

Letter a is an integer of 0, 1 or 2, and preferably equal to 0 or 1.

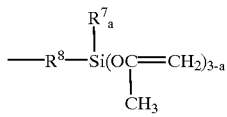

(4)

Herein $R^8$ represents divalent hydrocarbon groups of 2 to 10 carbon atoms, examples of which are as described for $R^1$. $R^7$ and a are as defined above.

In formula (2), $R^4$ represents monovalent hydrocarbon groups of 1 to 10 carbon atoms, examples of which are as described for $R^2$. In these hydrocarbon groups, some or all of the hydrogen atoms attached to carbon atoms may be replaced by fluorine atoms. Such substituted hydrocarbon groups are as described for $R^2$, for example, trifluoropropyl. $R^5$ represents $R^3$ or $R^4$, and the $R^5$ groups may be identical or different, with the proviso that at least one $R^5$ group is $R^3$ when n is 0.

Letter k is an integer of 0 to 100, preferably 0 to 60, m is an integer of 0 to 100, preferably 0 to 60, and n is an integer of 0 to 5. As described just above, at least one $R^5$ group is $R^3$ when n is 0. This means that the compound of formula (2) is a siloxane which contains at least one hydrolyzable group represented by $R^3$ in its molecule and optionally, a fluoroalkyl group.

In the surface treating composition of the invention, the first and second organic silicon compounds of formulas (1) and (2) may be mixed in any desired ratio although the weight ratio of the first to second organic silicon compound is preferably from 1:0.1 to 0.1:1, and especially from 0.5:1 to 1:0.5. In this regard, a too low content of the first organic silicon compound of formula (1) would fail to provide oil repellency whereas a too low content of the second organic silicon compound of formula (2) would allow the treated surface to be tacky. In either case, the desired anti-fouling properties would be lost.

On use, the surface treating composition of the invention is previously dissolved in suitable solvents. The solvent used is not critical as long as both the first and second organic silicon compounds of formula (1) and (2) are soluble therein. For example, fluorinated compounds such as m-xylene hexafluoride, pentafluorodichloropropane, and octadecafluorooctane are preferred solvents. The concentration of the organic silicon compounds of formula (1) and (2) combined may be determined as appropriate depending on the treating method. Concentrations of more than 0.1% by weight are desirable in order to provide sufficient water repellent and anti-fouling functions.

No particular limits are imposed on the type of substrate to be treated with the surface treating composition of the invention. Exemplary substrates include inorganic substrates such as glass, glass lenses, mirrors, metals, ceramics, porcelain, and pottery, organic materials such as rubber and plastics, and optical functional materials such as plastic lenses and liquid crystal display filters.

Also the treating method is not critical. For example, the surface of a substrate is wiped with a piece of fabric impregnated with the surface treating composition. Other useful methods include brush coating, dipping, spin coating, curtain coating, and vacuum deposition.

EXAMPLES

Examples of the invention are given below by way of illustration and not by way of limitation. All parts are by weight.

Examples 1–17 & Comparative Examples 1–4

Surface treating compositions in solution form were prepared by mixing a solution containing 5 parts of a first organic silicon compound 1-1 or 1-2 in 95 parts of the solvent shown in Table 2 and a solution containing 5 parts of a second organic silicon compound 2-1 to 2-5 in 95 parts of the solvent shown in Table 2, and diluting the mixture with the solvent so as to give the concentrations of organic silicon compounds shown in Table 2. Several substrates were treated with these solutions by the following procedure. The treated substrates were examined for a contact angle and fingerprint wiping. The results are shown in Table 2.

Substrate

Glass: float glass plate which had been previously cleaned on the surface with acetone Plastic lens: polycarbonate lens having a hard coat on its surface and silica evaporated thereon.

Polycarbonate: polycarbonate plate which had been previously cleaned on the surface with acetone PET: PET film having silica evaporated thereon Treating Procedure The substrate was dipped in the surface treating solution for 5 minutes, taken out of the solution, dipped twice in the same solvent as used in the solution, each for 1 minute, for cleaning, and then dried at 100° C. for 10 minutes.

Structure of Compound

Organic silicon compound of formula (1)
organic silicon compound 1-1: $C_4F_9C_2H_4Si(NH)_{3/2}$
organic silicon compound 1-2: $C_8F_{17}C_2H_4Si(NH)_{3/2}$ Organic silicon compound of formula (2)

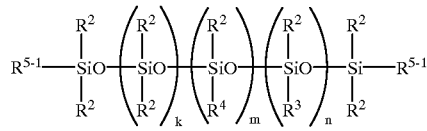

TABLE 1

| | $R^2$ | $R^3$ | $R^4$ | $R^{5-1}$ | $R^{5-2}$ | k | m | n |
|---|---|---|---|---|---|---|---|---|
| 2-1 | $CH_3$ | HDLZ1 | — | $CH_3$ | $CH_3$ | 50 | 0 | 3 |
| 2-2 | $CH_3$ | — | — | $CH_3$ | HDLZ1 | 30 | 0 | 0 |
| 2-3 | $CH_3$ | — | — | HDLZ1 | HDLZ1 | 30 | 0 | 0 |
| 2-4 | $CH_3$ | — | — | $CH_3$ | HDLZ2 | 30 | 0 | 0 |
| 2-5 | $CH_3$ | — | — | $CH_3$ | HDLZ3 | 30 | 0 | 0 |
| 2-6 | $CH_3$ | — | $-C_2H_4CF_3$ | HDLZ1 | HDLZ1 | 10 | 10 | 0 |

HDLZ1: hydrolyzable group $-C_2H_4SiCl_3$

HDLZ2: hydrolyzable group $-C_2H_4Si(OCCH_3)_3$ with $\|O$

HDLZ3: hydrolyzable group $-OSi(OCH_3)_3$

Tests

Contact Angle

Contact angles of the treated surface with water and hexadecane were measured by means of a contact angle meter CA-X150 by Kyowa Kaimen Kagaku K. K.

Fingerprint Wiping

A thumb was pressed onto the treated substrate. After 1 hour, the fingerprint was wiped 10 strokes with tissue paper. After wiping, the surface was visually observed.

A: no fingerprint left
B: some fingerprint left
C: fingerprint left substantially intact

TABLE 2

| | Organic silicon compound of formula (1) | | Organic silicon compound of formula (2) | | | | Contact angle (°) | | Finger- |
| | No. | Blend amount (%) | No. | Blend amount (%) | Solvent | Substrate | Water | Hexa-decane | print wiping |
|---|---|---|---|---|---|---|---|---|---|
| Example | | | | | | | | | |
| 1 | 1-1 | 3 | 2-2 | 3 | 1,1,1,2,2-pentafluoro-3,3-dichloropropane | glass | 100.2 | 69.2 | A |
| 2 | 1-1 | 3 | 2-5 | 3 | 1,1,1,2,2-pentafluoro-3,3-dichloropropane | glass | 98.1 | 68.9 | A |
| 3 | 1-2 | 3 | 2-1 | 3 | m-xylene hexafluoride | glass | 102.8 | 71.5 | A |
| 4 | 1-2 | 3 | 2-2 | 3 | m-xylene hexafluoride | glass | 104.5 | 72.3 | A |
| 5 | 1-2 | 3 | 2-3 | 3 | m-xylene hexafluoride | glass | 103.8 | 71.9 | A |
| 6 | 1-2 | 3 | 2-4 | 3 | m-xylene hexafluoride | glass | 102.9 | 70.3 | A |
| 7 | 1-2 | 3 | 2-5 | 3 | m-xylene hexafluoride | glass | 100.5 | 69.8 | A |
| 8 | 1-2 | 3 | 2-6 | 3 | m-xylene hexafluoride | glass | 105.1 | 76.5 | A |
| 9 | 1-2 | 1 | 2-2 | 1 | m-xylene hexafluoride | glass | 103.1 | 73.9 | A |
| 10 | 1-2 | 4 | 2-2 | 2 | m-xylene hexafluoride | glass | 105.8 | 76.1 | A |
| 11 | 1-2 | 2 | 2-2 | 4 | m-xylene hexafluoride | glass | 96.6 | 66.5 | B |
| 12 | 1-2 | 3 | 2-2 | 3 | m-xylene hexafluoride | plastic lens | 105.2 | 76.1 | A |
| 13 | 1-2 | 3 | 2-2 | 3 | m-xylene hexafluoride | polycarbonate | 103.2 | 72.1 | B |
| 14 | 1-2 | 3 | 2-2 | 3 | m-xylene hexafluoride | PET film | 104.7 | 75.9 | A |
| 15 | 1-2 | 3 | 2-5 | 3 | m-xylene hexafluoride | plastic lens | 103.6 | 73.1 | B |
| 16 | 1-2 | 3 | 2-5 | 3 | m-xylene hexafluoride | polycarbonate | 103.2 | 72.1 | B |
| 17 | 1-2 | 3 | 2-5 | 3 | m-xylene hexafluoride | PET film | 104.7 | 75.9 | B |
| Comparative Example | | | | | | | | | |
| 1 | 1-1 | 3 | — | — | m-xylene hexafluoride | glass | 103.9 | 74.6 | C |

TABLE 2-continued

| | Organic silicon compound of formula (1) | | Organic silicon compound of formula (2) | | | | Contact angle (°) | | Finger- |
|---|---|---|---|---|---|---|---|---|---|
| | | Blend | | Blend | | | | | |
| | No. | amount (%) | No. | amount (%) | Solvent | Substrate | Water | Hexa-decane | print wiping |
| 2 | 1-2 | 3 | — | — | m-xylene hexafluoride | glass | 105.1 | 76.6 | C |
| 3 | — | — | 2-2 | 3 | m-xylene hexafluoride | glass | 95.6 | 62.1 | C |
| 4 | $C_8F_{17}C_2H_4Si(OCH_3)_3$ | 2% | | 2% | isopropyl alcohol | glass | 101 | 64.5 | C |
| | 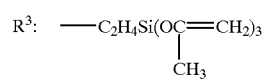 | | | | | | | | |
| | 0.1N-HCl | | | 0.10% | | | | | |

Examples 18–29 & Comparative Example 5

Surface treating compositions in solution form were prepared by mixing a solution containing 5 parts of the first organic silicon compound 1-1 or 1-2 (the same as used in Examples 1–17) in 95 parts of the solvent shown in Table 4 and a solution containing 5 parts of a second organic silicon compound 2-7 to 2-10 in 95 parts of the solvent shown in Table 4, and diluting the mixture with the solvent so as to give the concentrations of organic silicon compounds shown in Table 4. Several substrates were treated with these solutions by the same procedure as in Examples 1–17. The treated substrates were examined for a contact angle and fingerprint wiping. The results are shown in Table 4 where the results of Comparative Examples 1, 2 and 4 are reproduced.

Organic silicon compound of formula (2)

TABLE 3

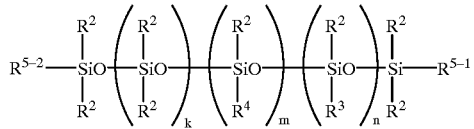

| | $R^2$ | $R^4$ | $R^{5-1}$ | $R^{5-2}$ | k | m | n |
|---|---|---|---|---|---|---|---|
| 2-7 | $CH_3$ | — | $CH_3$ | $CH_3$ | 50 | 0 | 3 |
| 2-8 | $CH_3$ | — | $CH_3$ | $R^3$ | 30 | 0 | 0 |
| 2-9 | $CH_3$ | — | $R^3$ | $R^3$ | 30 | 0 | 0 |
| 2-10 | $CH_3$ | $—C_2H_4CF_3$ | $R^3$ | $R^3$ | 10 | 10 | 0 |

$R^3$: $—C_2H_4Si(OC(CH_3){=}CH_2)_3$

TABLE 4

| | Organic silicon compound of formula (1) | | Organic silicon compound of formula (2) | | | | Contact angle (°) | | Finger- |
|---|---|---|---|---|---|---|---|---|---|
| | | Blend | | Blend | | | | | |
| | No. | amount (%) | No. | amount (%) | Solvent | Substrate | Water | Hexa-decane | print wiping |
| Example | | | | | | | | | |
| 18 | 1-1 | 3 | 2-7 | 3 | 1,1,1,2,2-pentafluoro-3,3-dichloropropane | glass | 103.2 | 70.2 | A |
| 19 | 1-1 | 3 | 2-8 | 3 | 1,1,1,2,2- | glass | 102.1 | 73.4 | A |

TABLE 4-continued

| | Organic silicon compound of formula (1) | | Organic silicon compound of formula (2) | | | | Contact angle (°) | | Finger- |
| | No. | Blend amount (%) | No. | Blend amount (%) | Solvent | Substrate | Water | Hexa-decane | print wiping |
|---|---|---|---|---|---|---|---|---|---|
| 20 | 1-2 | 3 | 2-8 | 3 | pentafluoro-3,3-dichloropropane m-xylene hexafluoride | glass | 104.1 | 73.1 | A |
| 21 | 1-2 | 2 | 2-8 | 4 | m-xylene hexafluoride | glass | 103.4 | 68.3 | B |
| 22 | 1-2 | 4 | 2-8 | 2 | m-xylene hexafluoride | glass | 104.2 | 73.7 | B |
| 23 | 1-2 | 1 | 2-8 | 1 | m-xylene hexafluoride | glass | 103.4 | 72.3 | A |
| 24 | 1-2 | 3 | 2-8 | 3 | m-xylene hexafluoride | plastic lens | 106.8 | 73.9 | A |
| 25 | 1-2 | 3 | 2-8 | 3 | m-xylene hexafluoride | polycarbonate | 100.1 | 70.5 | A |
| 26 | 1-2 | 3 | 2-8 | 3 | m-xylene hexafluoride | PET film | 107.1 | 74.8 | A |
| 27 | 1-2 | 3 | 2-9 | 3 | m-xylene hexafluoride | glass | 102.8 | 71.1 | A |
| 28 | 1-2 | 3 | 2-9 | 3 | m-xylene hexafluoride | plastic lens | 106.9 | 72.9 | A |
| 29 | 1-2 | 3 | 2-10 | 3 | m-xylene hexafluoride | glass | 104.1 | 74.5 | A |
| Comparative Example | | | | | | | | | |
| 1 | 1-1 | 3 | — | — | m-xylene hexafluoride | glass | 103.9 | 74.6 | C |
| 2 | 1-2 | 3 | — | — | m-xylene hexafluoride | glass | 105.1 | 76.6 | C |
| 5 | — | — | 2-8 | 3 | m-xylene hexafluoride | glass | 95.6 | 62.1 | C |
| 4 | $C_8F_{17}C_2H_4Si(OCH_3)_3$ | | 2% | | isopropyl alcohol | glass | 101 | 64.5 | C |
| | $HO-\left(\begin{array}{c}CH_3\\|\\SiO\\|\\CH_3\end{array}\right)_{20}H$ | | 2% | | | | | | |
| | 0.1N-HCl | | 0.1% | | | | | | |

After surface treatment with the compositions of the invention, substrates become highly water and oil repellent and improved in wiping-off of stain.

Japanese Patent Application Nos. 303552/1997 and 303553/1997 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A surface treating composition comprising first and second organic silicon compounds, the first organic silicon compound having formula (1):

$$Rf-R^1Si(NH)_{3/2} \quad (1)$$

wherein Rf is a perfluoroalkyl group of 1 to 10 carbon atoms and $R^1$ is a divalent hydrocarbon group of 2 to 10 carbon atoms, the second organic silicon compound having formula (2):

$$R^5-SiO\left(\begin{array}{c}R^2\\|\\SiO\\|\\R^2\end{array}\right)_k\left(\begin{array}{c}R_2\\|\\SiO\\|\\R^4\end{array}\right)_m\left(\begin{array}{c}R^2\\|\\SiO\\|\\R^3\end{array}\right)_n\begin{array}{c}R^2\\|\\Si-R^5\\|\\R^2\end{array} \quad (2)$$

wherein $R^2$ independently represents monovalent hydrocarbon groups of 1 to 10 carbon atoms, $R^3$ is a hydrolyzable group of formula (3) or (4):

$$-R^6-SiX_{3-a}R^7_a \quad (3)$$

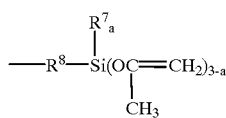
(4)

wherein $R^6$ is a divalent hydrocarbon group of 2 to 10 carbon atoms or oxygen atom, $R^7$ is a monovalent hydrocarbon group of 1 to 10 carbon atoms, $R^8$ is a divalent hydrocarbon group of 2 to 10 carbon atoms, X is a halogen atom, acyloxy group of 2 to 10 carbon atoms, or alkoxy group of 1 to 10 carbon atoms, and a is an integer of 0 to 2, $R^4$ is a monovalent hydrocarbon group of 1 to 10 carbon atoms which may contain fluorine atoms, $R^5$ represents $R^3$ or $R^4$, and the $R^5$ groups may be identical or different, k is an integer of 0 to 100, m is an integer of 0 to 100, n is an integer of 0 to 5, with the proviso that at least one $R^5$ group is $R^3$ when n is 0.

2. The surface treating composition of claim 1, wherein $R_f$ is a perfluoroalkyl group of 4–10 carbon atoms, and $R^1$ is alkylene, cycloalkylene or arylene.

3. The surface treating composition of claim 2, wherein $R^1$ is ethylene, propylene or phenylene.

4. The surface treating composition of claim 1, wherein $R^2$ is alkyl, cycloalkyl, alkenyl, aryl or aralkyl.

5. The surface treating composition of claim 4, wherein $R^2$ is methyl, ethyl, phenyl, tolyl or phenylethyl.

6. The surface treating composition of claim 1, wherein $R^6$ is alkylene, cycloalkylene or arylene.

7. The surface treating composition of claim 6, wherein $R^6$ is ethylene, propylene or phenylene.

8. The surface treating composition of claim 1, wherein $R^7$ is alkyl, cycloalkyl, alkenyl, aryl or aralkyl.

9. The surface treating composition of claim 8, wherein $R^7$ is methyl, phenyl, tolyl or phenylethyl.

10. The surface treating composition of claim 1, wherein X is chlorine,

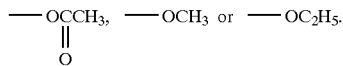

11. The surface treating composition of claim 1, wherein a is 0 or 1.

12. The surface treating composition of claim 1, wherein $R^8$ is alkylene, cycloalkylene or arylene.

13. The surface treating composition of claim 12, wherein $R^8$ is ethylene, propylene or phenylene.

14. The surface treating composition of claim 1, wherein $R^4$ is alkyl, cycloalkyl, alkenyl, aryl or aralkyl.

15. The surface treating composition of claim 14, wherein $R^4$ is methyl, ethyl, phenyl, tolyl or phenylethyl.

16. The surface treating composition of claim 1, wherein k is 0 to 60 and m is 0 to 60.

17. The surface treating composition of claim 1, wherein said first and second organic silicon compounds are in a weight ratio of 1:0.1 to 0.1:1.

18. The surface treating composition of claim 17, wherein the first and second organic silicon compounds are in a weight ratio of 0.5:1 to 1:0.5.

19. The surface treating composition of claim 1, which is dissolved in a solvent such that the combined concentration of said first and second organic silicon compounds is greater than 0.1% by weight.

* * * * *